United States Patent
Yanagisawa

(10) Patent No.: US 9,538,088 B2
(45) Date of Patent: Jan. 3, 2017

(54) ZOOM LENS AND IMAGING APPARATUS

(71) Applicant: Sony Corporation, Tokyo (JP)

(72) Inventor: Tadashi Yanagisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/212,235

(22) Filed: Mar. 14, 2014

(65) Prior Publication Data

US 2014/0313397 A1    Oct. 23, 2014

(30) Foreign Application Priority Data

Apr. 17, 2013   (JP) ................................ 2013-086358

(51) Int. Cl.
| | |
|---|---|
| *G02B 15/14* | (2006.01) |
| *G02B 27/64* | (2006.01) |
| *H04N 5/232* | (2006.01) |
| *G02B 15/22* | (2006.01) |
| *G02B 15/173* | (2006.01) |

(52) U.S. Cl.
CPC .......... *H04N 5/23296* (2013.01); *G02B 15/14* (2013.01); *G02B 15/173* (2013.01); *G02B 15/22* (2013.01); *G02B 27/646* (2013.01)

(58) Field of Classification Search
CPC ......... G02B 15/00; G02B 15/14; G02B 15/15; G02B 15/16; G02B 15/163; G02B 15/173; G02B 15/20; G02B 15/22; G02B 15/24; G02B 15/28; G02B 27/64; G02B 27/646
See application file for complete search history.

(56) References Cited

U.S. PATENT DOCUMENTS

| | | | | |
|---|---|---|---|---|
| 4,702,567 | A * | 10/1987 | Kato .................... | G02B 15/173 359/683 |
| 4,830,477 | A * | 5/1989 | Takahashi ............ | G02B 15/173 359/683 |
| 6,061,180 | A * | 5/2000 | Hayakawa ..................... | 359/557 |
| 6,147,810 | A * | 11/2000 | Misaka ......................... | 359/684 |
| 7,532,412 | B2 * | 5/2009 | Hatada .......................... | 359/688 |
| 7,952,800 | B2 * | 5/2011 | Nakayama ........... | G02B 21/025 359/434 |
| 2002/0063970 | A1 * | 5/2002 | Uzawa ................... | G02B 15/17 359/689 |
| 2004/0125462 | A1 * | 7/2004 | Misaka ......................... | 359/684 |

(Continued)

FOREIGN PATENT DOCUMENTS

| | | |
|---|---|---|
| JP | 2010-271362 | 12/2010 |
| JP | 2011-039560 | 2/2011 |

*Primary Examiner* — Thong Nguyen
(74) *Attorney, Agent, or Firm* — Michael Best & Friedrich LLP

(57) ABSTRACT

A zoom lens includes: a first lens group having positive refractive power; a second lens group having negative refractive power; a third lens group having positive refractive power; a fourth lens group having positive refractive power; a fifth lens group having negative refractive power; and a sixth lens group having positive refractive power. The first to sixth lens groups are arranged in order from an object side. A total length of the zoom lens varies when a lens position state varies from a wide end state to a telephoto end state. A focusing operation is performed through allowing the fifth lens group to travel along an optical axis in accordance with variation in a subject distance from infinite to a closer distance.

18 Claims, 21 Drawing Sheets

(56) References Cited

U.S. PATENT DOCUMENTS

| | | | |
|---|---|---|---|
| 2005/0190447 A1* | 9/2005 | Misaka | G02B 27/646 359/557 |
| 2012/0026602 A1* | 2/2012 | Uchida | G02B 27/646 359/684 |
| 2014/0139722 A1* | 5/2014 | Sugita | 348/345 |
| 2014/0146216 A1* | 5/2014 | Okumura | G02B 15/173 348/340 |
| 2014/0176778 A1* | 6/2014 | Kim | G02B 15/173 348/335 |
| 2014/0211029 A1* | 7/2014 | Okumura | G02B 15/173 348/208.11 |
| 2015/0219883 A1* | 8/2015 | Mogi | G02B 15/173 359/683 |

* cited by examiner

ZOOM LENS AND IMAGING APPARATUS

CROSS REFERENCE TO RELATED APPLICATIONS

This application claims the benefit of Japanese Priority Patent Application JP 2013-086358 filed Apr. 17, 2013, the entire contents of each which are incorporated herein by reference.

BACKGROUND

The present disclosure relates to a zoom lens and to an imaging apparatus that includes a zoom lens. In particular, the present disclosure relates to a zoom lens that is preferable as an imaging lens system in a digital camera system having an interchangeable lens, and is suitable for shooting of moving image, and relates to an imaging apparatus that includes such a zoom lens.

Recently, a digital camera system having an interchangeable lens has been widely used. In particular, demand has been moved to a so-called mirrorless digital camera that is a digital camera system having an interchangeable lens that includes no quick return mirror in a main body of the camera. For such a camera system, an imaging lens system has been desired that is more compact and has high optical performance. Such a camera system has a function of shooting a moving image. In order to perform automatic focusing during the shooting of a moving image, it is necessary to reduce a weight of a focusing group and to reduce variation in shooting angle of view resulting from the movement of the focusing lens group.

Japanese Unexamined Patent Application Publication No. 2010-271362 proposes a zoom lens system that is configured of a first lens group having positive refractive power, a second lens group having negative refractive power, a third lens group having positive refractive power, a fourth lens group having negative refractive power, and a fifth lens group having positive refractive power, that are arranged in order from an object side. In this zoom lens system, a focusing operation is performed through allowing the second lens group to travel along an optical axis. However, in this case, the zoom lens system only has five lens groups that have spacings that are allowed to vary at the time of a zooming operation. Therefore, a traveling amount of each group increases. Accordingly, it is difficult to reduce a size of the zoom lens system. Moreover, a focusing operation is performed through allowing the second lens group as a whole to travel along the optical axis. Therefore, the second lens group has a large weight. Therefore, a driving actuator is increased in size, and also a lens barrel is increased in size. Moreover, when the zoom lens system is driven to perform the focusing operation at the time of shooting a moving image, etc., an issue may also arise that an amount of variation in a range of an angle of view to be shot increases.

Japanese Unexamined Patent Application Publication No. 2011-39560 proposes a zoom lens group that is configured of a first lens group having positive refractive power, a second lens group having negative refractive power, a third lens group having positive refractive power, a fourth lens group having positive refractive power, a fifth lens group having negative refractive power, and a sixth lens group having positive refractive power, that are arranged in order from an object side. In this zoom lens system, a focusing operation is performed through allowing the second lens group to travel along an optical axis. However, since the focusing operation is performed through allowing the second lens group as a whole to travel along the optical axis, the second lens group has a large weight. Therefore, a driving actuator is increased in size, and also a lens barrel is increased in size. Moreover, when the zoom lens system is driven to perform the focusing operation at the time of shooting a moving image, etc., an issue may also arise that an amount of variation in a range of an angle of view to be shot increases. Moreover, since all of the six lens groups travel with different loci at the time of the zooming operation, a mechanism that allows the lens groups to travel is complicated, and therefore, the lens barrel is increased in size.

SUMMARY

It is desirable to provide a zoom lens that is suitable for shooting of a moving image while achieving a more-compact size and high optical performance, and to provide an imaging apparatus that includes such a zoom lens.

According to an embodiment of the present disclosure, there is provided a zoom lens including: a first lens group having positive refractive power; a second lens group having negative refractive power; a third lens group having positive refractive power; a fourth lens group having positive refractive power; a fifth lens group having negative refractive power; and a sixth lens group having positive refractive power. The first to sixth lens groups are arranged in order from an object side. A total length of the zoom lens varies when a lens position state varies from a wide end state to a telephoto end state. A focusing operation is performed through allowing the fifth lens group to travel along an optical axis in accordance with variation in a subject distance from infinite to a closer distance.

According to an embodiment of the present disclosure, there is provided an imaging apparatus with a zoom lens and an imaging device outputting an imaging signal based on an optical image formed by the zoom lens, the zoom lens including: a first lens group having positive refractive power; a second lens group having negative refractive power; a third lens group having positive refractive power; a fourth lens group having positive refractive power; a fifth lens group having negative refractive power; and a sixth lens group having positive refractive power. The first to sixth lens groups are arranged in order from an object side. A total length of the zoom lens varies when a lens position state varies from a wide end state to a telephoto end state. A focusing operation is performed through allowing the fifth lens group to travel along an optical axis in accordance with variation in a subject distance from infinite to a closer distance.

In the zoom lens and the imaging apparatus according to the above-described embodiments of the present disclosure, an arrangement of the refractive powers of the respective first to sixth lens groups is optimized. The focusing operation is performed through allowing the fifth lens group to travel along the optical axis.

According to the zoom lens and the imaging apparatus of the above-described embodiments of the present disclosure, the arrangement of the refractive powers of the respective first to sixth lens groups is optimized. Also, the focusing operation is performed through allowing the fifth lens group to travel along the optical axis. Therefore, it is possible to be suitable for shooting of a moving image while achieving a more-compact size and high optical performance.

It is to be noted that the effects described in this specification are mere examples and the effects of the embodiments of the present disclosure are not limited thereto. Also, the embodiments of the present disclosure may also have additional effects.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
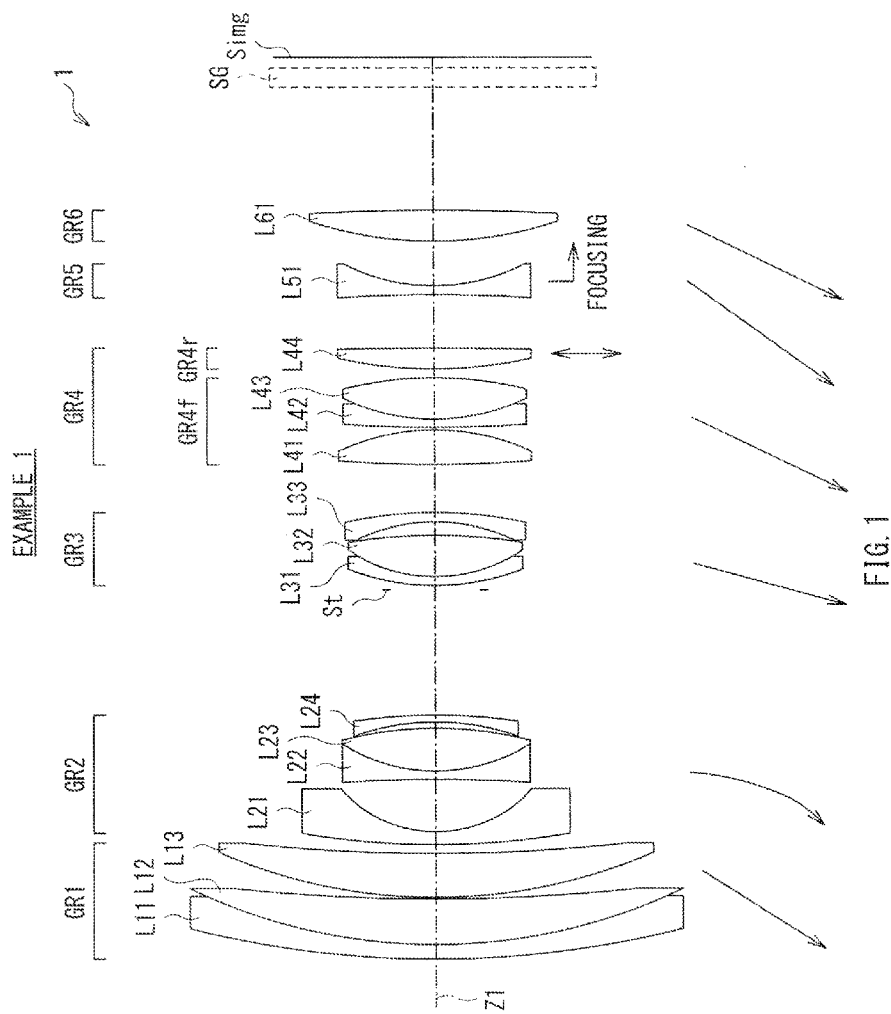
FIG. 1 is a cross-sectional view of a lens at in a short focal length end state that illustrates a first configuration example of a zoom lens according to an embodiment of the present disclosure.

Some embodiments of the present disclosure will be described below in detail referring to the drawings. The description will be given in the following order.
 1. Basic Configuration of Lens
 2. Functions and Effects
 3. Application Examples to Imaging Apparatus
 4. Numerical Examples of Lens
 5. Other Embodiments

[1. Basic Configuration of Lens]

Figure 2:
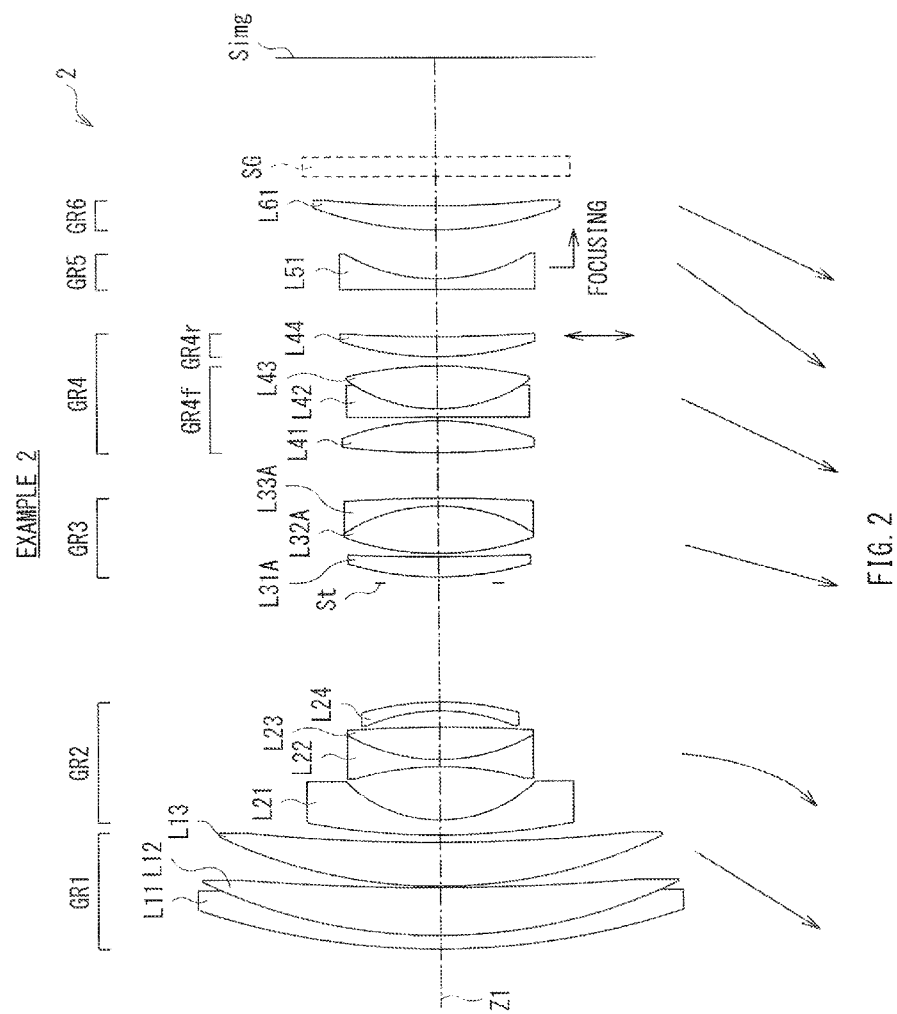
FIG. 2 is a cross-sectional view of a lens in a short focal length end state that illustrates a second configuration example of the zoom lens.

FIG. 1 illustrates a first configuration example of a zoom lens according to an embodiment of the present disclosure. This configuration example corresponds to a lens configuration in Numerical example 1 which will be described later. Similarly, FIG. 2 illustrates a second configuration example that corresponds to a lens configuration in Numerical example 2 which will be described later. In FIG. 1, etc., the symbol Simg represents image plane, and Z1 represents an optical axis. An optical member SG such as a sealing glass for protecting an imaging device and various optical filters may be arranged between the zoom lens and the image plane Simg.

The configuration of the zoom lens according to the present embodiment will be described below in correspondence with the configuration examples shown in FIG. 1, etc. as appropriate. However, the technology of the present disclosure is not limited to the configuration examples shown in the drawings.

The zoom lens according to the present embodiment is substantially configured of six lens groups, that are a first lens group GR1, a second lens group GR2, a third lens group GR3, a fourth lens group GR4, a fifth lens group GR5, and a sixth lens group GR6, that are arranged in order from an object side along the optical axis Z1. The first lens group GR1 has positive refractive power. The second lens group GR2 has negative refractive power. The third lens group GR3 has positive refractive power. The fourth lens group GR4 has positive refractive power. The fifth lens group GR5 has negative refractive power. The sixth lens group GR6 has positive refractive power.

The zoom lens according to the present embodiment may be desirably configured to allow all of the first to sixth lens groups GR1 to GR6 to travel along the optical axis so that the total length of the zoom lens varies when a lens position state varies from a wide end state to a telephoto end state.

The zoom lens according to the present embodiment may be desirably configured to perform a focusing operation through allowing the fifth lens group GR5 to travel along the optical axis in accordance with variation in a subject distance from infinite to a closer distance. The fifth lens group GR5 may be desirably configured of a single lens.

Moreover, the zoom lens according to the present embodiment may desirably satisfy predetermined conditional expressions, etc. that will be described later.

[2. Functions and Effects]

Next, description will be given on functions and effects of the zoom lens according to the present embodiment.

According to the zoom lens of the present embodiment, an arrangement of refractive powers of the respective first to sixth lens groups is optimized, and the focusing operation is performed through allowing the fifth lens group GR5 to travel along the optical axis. Therefore, the zoom lens is suitable for shooting a moving image, while achieving a more-compact size and high optical performance. In particular, since the fifth lens group GR5 serves as a focusing lens group to perform the focusing operation, the focusing lens group to be driven becomes light in weight, and therefore, it is possible to move the focusing lens group at high speed with the use of a compact actuator, even in a case, for example, where an automatic focusing operation is performed during shooting of a moving image. When the compact actuator is allowed to be used, it is also possible to reduce a size of a lens barrel. Also, it is possible to reduce variation in a shooting angle of view resulting from the movement of the focusing lens group.

In the zoom lens of the present embodiment, the fourth lens group GR4 may desirably include a plurality of lenses, and an image may be desirably shifted through allowing at least one lens, as a lens group for image blur compensation, out of the plurality of lenses to move in a direction perpendicular to the optical axis Z1. Moreover, the fourth lens group GR4 may be desirably configured of a first sub-lens group GR4$f$ and a second sub-lens group GR4$r$ that are arranged in order from the object side, and an image may be desirably shifted through allowing the second sub-lens group GR4$r$, as the lens group for image blur compensation, to move in the direction perpendicular to the optical axis Z1. Such a configuration reduces an amount of the movement of the lens group for image blur compensation in the direction perpendicular to the optical axis Z1 when the image is shifted. Also, the lens group for image blur compensation that is to be moved becomes light in weight. Therefore, a compact actuator is allowed to be used, and the mirror barrel is allowed to be reduced in size.

In the zoom lens of the present embodiment, the fourth lens group GR4 and the sixth lens group GR6 may be desirably allowed to travel together along the optical axis when the lens position state varies from the wide end state to the telephoto end state. By allowing the fourth lens group GR4 and the sixth lens group GR6 to travel together, a mechanical structure that drives the first to sixth lens groups GR1 to GR6 becomes simple. This achieves reduction in size of the mirror barrel.

[Explanation of Conditional Expressions]

The zoom lens according to the present embodiment becomes advantageous in reduction in size and obtains more favorable optical performance by optimizing the configurations of the respective lens groups to allow at least one of the following conditional expressions, and preferably, two or more in combination thereof to be satisfied.

$$0 < f4/f6 < 0.8 \tag{1}$$

In the above-described Conditional expression (1), f4 is a focal length of the fourth lens group GR4, and f6 is a focal length of the sixth lens group GR6.

By allowing Conditional expression (1) to be satisfied, the power arrangement of the fourth lens group GR4 and the sixth lens group GR6 is optimized. Therefore, the size of the mirror barrel is reduced. In particular, a total length of the mirror barrel in a shortest state during the zooming operation is reduced. If a value of f4/f6 is out of the numerical range in Conditional expression (1), reduction in size is difficult.

It is to be noted that, in order to allow the zoom lens to be more advantageous in reduction in size, the numerical range in Conditional expression (1) may be preferably set as in the following Conditional expression (1)'.

$$0.2 < f4/f6 < 0.4 \tag{1'}$$

$$0.6 < f6/fT < 1.0 \tag{2}$$

In the above-described Conditional expression (2), fT is a total focal length of the zoom lens in a telephoto end state.

By allowing Conditional expression (2) to be satisfied, the power arrangement of the sixth lens group GR6 is optimized. Therefore, the size of the mirror barrel is reduced. In particular, the total length of the mirror barrel in the shortest state during the zooming operation is reduced. If a value of f6/fT is out of the numerical range in Conditional expression (2), reduction in size is difficult.

It is to be noted that, in order to allow the zoom lens to be more advantageous in reduction in size, the numerical range in Conditional expression (2) may be preferably set as in the following Conditional expression (2)'.

$$0.7 < f6/fT < 1.0 \tag{2'}$$

$$1.0 < f1/fT < 2.0 \tag{3}$$

In the above-described Conditional expression (3), f1 is a focal length of the first lens group GR1.

By allowing Conditional expression (3) to be satisfied, the power arrangement of the first lens group GR1 is optimized. Therefore, the size of the mirror barrel is reduced. In particular, the total length of the mirror barrel in the shortest state during the zooming operation is reduced. If a value of f1/fT is out of the numerical range in Conditional expression (3), reduction in size is difficult.

It is to be noted that, in order to allow the zoom lens to be more advantageous in reduction in size, the numerical range in Conditional expression (3) may be preferably set as in the following Conditional expression (3)'.

$$1.0 < f1/fT < 1.5 \tag{3'}$$

$$-2.0 < (R4bf - R4br)/(R4bf + R4br) < -0.5 \tag{4}$$

In the above-described Conditional expression (4), R4$bf$ is a curvature radius of a most-object-sided lens surface in the second sub-lens group GR4$r$, and R4$br$ is a curvature radius of a most-image-sided lens surface in the second sub-lens group GR4$r$.

Conditional expression (4) defines an appropriate relationship between the curvature radius of the most-object-sided lens surface and the curvature radius of the most-image-sided lens surface in the second sub-lens group GR4$r$ that is used as the lens group for image blur compensation. When a value of (R4$bf$−R4$br$)/(R4$bf$+R4$br$) is larger than the upper limit in Conditional expression (4), correction of field curvature is difficult. When the value of (R4$bf$−R4$br$)/(R4$bf$+R4$br$) is smaller than the lower limit in Conditional expression (4), variation in a field curvature amount resulting from allowing the second sub-lens group GR4$r$ to move in the vertical direction increases when the image shift is performed using the second sub-lens group GR4$r$ as the lens group for image blur compensation.

It is to be noted that, in order to achieve higher optical performance, the numerical range in Conditional expression (4) may be preferably set as in the following Conditional expression (4)'.

$$-1.5 < (R4bf - R4br)/(R4bf + R4br) < -0.5 \tag{4'}$$

$$-2.5 < (R6f - R6r)/(R6f + R6r) < 0 \tag{5}$$

In the above-described Conditional expression (5), R6$f$ is a curvature radius of a most-object-sided lens surface in the sixth lens group GR6, and R6$r$ is a curvature radius of a most-image-sided lens surface in the sixth lens group GR6.

Conditional expression (5) defines an appropriate relationship between the curvature radius of the most-object-sided lens surface and the curvature radius of the most-image-sided lens surface in the sixth lens group GR6. If a value of (R6$f$−R6$r$)/(R6$f$+R6$r$) is out of the numerical range in Conditional expression (5), correction of the field curvature is difficult.

It is to be noted that, in order to achieve higher optical performance, the numerical range in Conditional expression (5) may be preferably set as in the following Conditional expression (5)'.

$$-2.0 < (R6f - R6r)/(R6f + R6r) < -0.5 \tag{5'}$$

[3. Application Examples to Imaging Apparatus]

Figure 21:
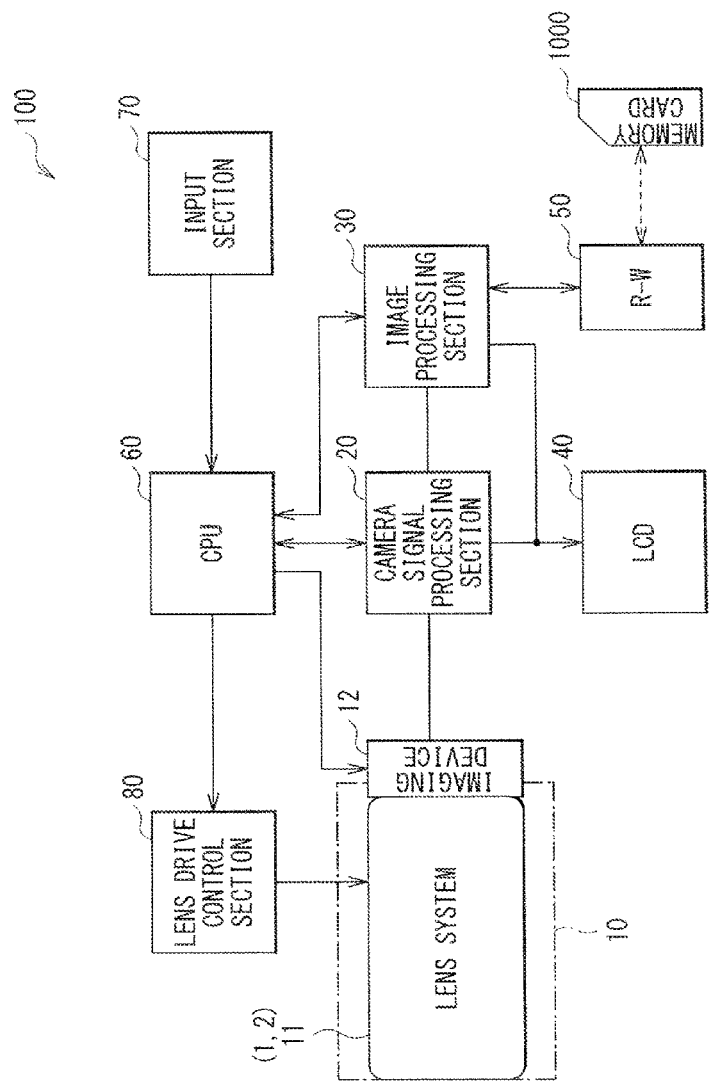
FIG. 21 is a block diagram that illustrates a configuration example of an imaging apparatus.

FIG. 21 illustrates a configuration example of an imaging apparatus 100 to which the zoom lens according to the present embodiment is applied. This imaging apparatus 100 may be, for example, a digital still camera. The imaging apparatus 100 may include a camera block 10, a camera signal processing section 20, an image processing section 30, an LCD (Liquid Crystal Display) 40, a R-W (reader-writer) 50, a CPU (Central Processing Unit) 60, an input section 70, and a lens drive control section 80.

The camera block 10 has an imaging function. The camera block 10 includes an optical system including a lens system 11 (a zoom lens 1 or 2) that serves as an imaging lens, and an imaging device 12 such as a CCD (Charge Coupled Device) and a CMOS (Complementary Metal Oxide Semiconductor). The imaging device 12 converts an optical image formed by the lens system 11 into an electric signal, and thereby, outputs an imaging signal (image signal) based on the optical image.

The camera signal processing section 20 performs, on the image signal outputted from the imaging device 12, various signal processings such as analog-to-digital conversion, denoising, correction of image quality, and conversion into a luminance color-difference signal.

The image processing section 30 performs recording and reproducing processing of the image signal. The image processing section 30 performs processings such as compression coding and extension decoding processing of an image signal based on a predetermined image data format and conversion processing for data specification such as resolution.

The LCD 40 has a function of displaying various data such as a shot image and a state of operation by a user with respect to the input section 70. The R-W 50 writes the image data coded by the image processing section 30 in a memory card 1000, and reads the image data recorded in the memory card 1000. The memory card 1000 may be, for example, a semiconductor memory that is attachable and detachable to a slot connected to the R-W 50.

The CPU 60 serves as a control processing section that controls each circuit block that is provided in the imaging apparatus 100. The CPU 60 may control each circuit block based on, for example, an instruction input signal from the input section 70, etc. The input section 70 may be configured of components such as various switches with which the user performs a predetermined operation. The input section 70 may be configured of components such as a shutter release button for performing shutter operation and a selection switch for selecting an operation mode. The input section 70 may output, to the CPU 60, the instruction input signal based on the operation by the user. The lens drive control section 80 controls drive of a lens that is arranged in the camera block 10. The lens drive control section 80 controls components such as an unillustrated motor that drives each lens in the lens system 11 based on the control signal from the CPU 60.

The imaging apparatus 100 includes a shake detection section that detects shake of the apparatus resulting from shake of a hand, which is not illustrated.

The operation of the imaging apparatus 100 will be described below.

In a state of standby for shooting, under the control by the CPU 60, the image signal of the image shot by the camera block 10 is outputted to the LCD 40 via the camera signal processing section 20, and the outputted image signal is displayed as a camera-through image. For example, when the instruction input signal for zooming, focusing, etc. from the input section 70 is inputted, the CPU 60 outputs the control signal to the lens drive control section 80, and a predetermined lens in the lens system 11 travels based on the control by the lens drive control section 80.

When a shutter which is not illustrated in the camera block 10 operates based on the instruction input signal from the input section 70, the image signal of the shot image is outputted from the camera signal processing section 20 to the image processing section 30, and the outputted image signal is subjected to compression coding to be converted into digital data of a predetermined data format. The converted data is outputted to the R-W 50, and is written in the memory card 1000.

It is to be noted that the focusing operation is performed through allowing, with use of the lens drive control section 80, the predetermined lens in the lens system 11 to travel based on the control signal from the CPU 60, for example, in a case such as a case where the shutter release button in the input section 70 is pressed half way or a case where the shutter release button is pressed all the way for recording (shooting).

When reproducing the image data recorded in the memory card 1000, the R-W 50 reads predetermined image data from the memory card 1000 based on the operation with respect to the input section 70, the image processing section 30 performs extension decoding on the read image data, then the image processing section 30 outputs a reproduction image signal to the LCD 40, and a reproduction image is displayed on the LCD 40.

The CPU 60 allows the lens drive control section 80 to operate based on a signal outputted from the shake detection section which is not illustrated, and allows the lens group for image blur compensation to move in a direction substantially perpendicular to the optical axis Z1 in accordance with the amount of shake.

It is to be noted that the description has been given on the example in which the imaging apparatus is applied to the digital still camera in the above embodiment. However, a range of application of the imaging apparatus is not limited to a digital still camera, and other various electronic apparatuses may be specific targets of application of the imaging apparatus 100. For example, other various electronic apparatuses such as a camera with an interchangeable lens and a digital video camcorder may be the specific targets of application of the imaging apparatus 100.

EXAMPLES

[4. Numerical Examples of Lens]

Next, description will be given on specific numerical examples of the zoom lens according to the present embodiment.

It is to be noted that symbols etc. in the tables and the description below represent the followings. "Surface No" represents the number of an i-th surface where the attached number is increased in order from the most-object-sided surface. "Ri" represents a value (mm) of a paraxial curvature radius of the i-th surface. "Di" represents a value (mm) of a spacing along the optical axis between the i-th surface and the (i+1)th surface. "Ni" represents a value of a refractive index of the d-line (having a wavelength of 587.6 nm) of a material of an optical component that has the i-th surface. "vdi" represents a value of an Abbe number of the d-line of the material of the optical component that has the i-th surface. "Infinity" in the value of "Ri" indicates that the relevant surface is a planar surface or an aperture surface (an aperture stop St). "STO" in "Surface No" indicates that the relevant surface is the aperture stop St.

"ASP" in "Surface No" indicates that the relevant surface is aspherical. A shape of an aspherical surface is defined by the following expression of aspherical surface, where "x" is a distance from a vertex of the lens surface along the optical axis (a sag amount), "Y" is a height in a direction perpendicular to the optical axis, "c" is a paraxial curvature at the vertex of the lens (an inverse of the curvature radius), "K" is a conic constant, and "Ai" is an aspherical surface coefficient of i-th order (where i is an integer of 3 or larger). It is to be noted that, in each table that shows aspherical surface coefficients which will be described later, "E-i" indicates an exponential expression having 10 as a base, that is, "$10^{-i}$". To give an example, "0.12345E-05" represents "$0.12345 \times 10^{-5}$".

[Expression of Aspherical Surface]

$$x = c^2 Y^2 / [1 + \{1 - (1+K)c^2 Y^2\}^{1/2}] + \Sigma Ai \cdot Y^i$$

[Configuration Common to Respective Numerical Examples]

The zoom lenses 1 and 2 according to the respective numerical examples below each have a configuration that satisfies the above-described basic configuration of the lens and the desirable conditions. The zoom lenses 1 and 2 according to the respective numerical examples each include the first lens group GR1, the second lens group GR2, the third lens group GR3, the fourth lens group GR4, the fifth lens group GR5, and the sixth lens group GR6 that are arranged in order from the object side, and are each substantially configured of six lens groups.

The aperture stop St is arranged between the second lens group GR2 and the third lens group GR3. The optical member SG such as a sealing glass for protecting the imaging device and various optical filters may be arranged between the zoom lens 1 or 2 and the image plane Simg. However, the optical member SG is omitted in the numerical examples below.

Numerical Example 1

Tables 1 to 3 show specific numerical examples that correspond to the zoom lens 1 according to the first configuration example shown in FIG. 1. In particular, Table 1 shows basic lens data thereof, Table 2 shows data related to aspherical surfaces, and Table 3 shows other data.

In this Numerical example 1, the first lens group GR1 is configured of a cemented lens in which a negative meniscus lens L11 is attached to a positive meniscus lens L12, and a positive meniscus lens L13, that are arranged in order from the object side. The negative meniscus lens L11 has a convex surface facing toward the object side. The positive meniscus lens L12 has a convex surface facing toward the object side. The positive meniscus lens L13 has a convex surface facing toward the object side. The second lens group GR2 is configured of a negative meniscus lens L21, a cemented lens in which a biconcave lens L22 is attached to a biconvex lens L23, and a negative meniscus lens L24, that are arranged in order from the object side. The negative meniscus lens L21 has a convex surface facing toward the object side. The negative meniscus lens L24 has a concave surface facing toward the object side. The third lens group GR3 is configured of a cemented lens in which a negative meniscus lens L31 is attached to a biconvex lens L32, and a negative meniscus lens L33, that are arranged in order from the object side. The negative meniscus lens L31 has a convex surface facing toward the object side. The negative meniscus lens L33 has a concave surface facing toward the object side. The fourth lens group GR4 is configured of a biconvex lens L41, the first sub-lens group GR4f, and the second sub-lens group GR4r, that are arranged in order from the object side. The first sub-lens group GR4f is configured of a cemented lens in which a negative lens L42 that has a convex surface facing toward the object side and a biconvex lens L43. The second sub-lens group GR4r is configured of a biconvex lens L44. The second sub-lens group GR4r is allowed to move in the direction perpendicular to the optical axis Z1 as the lens group for image blur compensation, and thereby, an image is allowed to be shifted. The fifth lens group GR5 is configured of a biconcave lens L51. The focusing operation is allowed to be performed when the subject distance varies from the infinite to a closer distance through allowing the fifth lens group GR5 to travel along the optical axis. The sixth lens group GR6 is configured of a biconvex lens L61.

In this Numerical example 1, both surfaces of the negative meniscus lens L21 and an image-sided surface of the negative meniscus lens L24 in the second lens group GR2 are aspherical. Also, an object-sided surface of the biconvex lens L41 in the fourth lens group GR4 and both surfaces of the biconcave lens L51 in the fifth lens group GR5 are aspherical. Table 2 shows values of aspherical surface coefficients A4, A6, A8, and A10 of 4th-order, 6th-order, 8th-order, and 10th-order of the above-mentioned aspherical surfaces together with values of conic constant K.

Table 3 shows values of a total focal length f, a F number Fno, and a half angle of view w of the zoom lens in a short focal length end (wide end) state, in an intermediate focal length state that is between the short focal length end state and a long focal length end (telephoto end) state, and in the long focal length end state. In this Numerical example 1, when the lens position state varies from the wide end state to the telephoto end state, all of the first to sixth lens groups GR1 to GR6 travel along the optical axis. At that time, surface spacings D5, D12, D18, D25, D27, and D29 before on both sides of the first to sixth lens groups GR1 to GR6 vary. Table 3 also shows values of the surface spacings D5, D12, D18, D25, D27, and D29 in the short focal length end state, in the intermediate focal length state, and in the long focal length end state.

TABLE 1

Example 1

| Lens group | Surface No | Ri | Di | Ni | vdi |
|---|---|---|---|---|---|
| GR1 | 1 | 84.340 | 1.5 | 1.84666 | 23.78 |
| | 2 | 49.538 | 4.58 | 1.62041 | 60.34 |
| | 3 | 176.090 | 0.2 | | |
| | 4 | 46.598 | 4.41 | 1.72916 | 54.67 |
| | 5 | 155.000 | (D5) | | |
| GR2 | 6(ASP) | 74.934 | 1.3 | 1.85135 | 40.10 |
| | 7(ASP) | 11.384 | 5.29 | | |
| | 8 | −96.216 | 0.8 | 1.83400 | 37.35 |
| | 9 | 14.921 | 4.42 | 1.84666 | 23.78 |
| | 10 | −32.137 | 0.55 | | |
| | 11 | −20.465 | 0.8 | 1.82080 | 42.71 |
| | 12(ASP) | −64.006 | (D12) | | |
| | 13(STO) | Infinity | 0.5 | | |
| GR3 | 14 | 22.009 | 0.8 | 1.90366 | 31.31 |
| | 15 | 13.031 | 4.25 | 1.74330 | 49.22 |
| | 16 | −54.421 | 1.41 | | |
| | 17 | −15.550 | 0.8 | 1.80611 | 40.73 |
| | 18 | −39.947 | (D18) | | |
| GR4 | 19(ASP) | 63.402 | 3.49 | 1.69350 | 53.20 |
| | 20 | −19.063 | 0.25 | | |
| | 21 | 134.770 | 0.8 | 1.91082 | 35.25 |
| | 22 | 18.387 | 4.19 | 1.49700 | 81.61 |
| | 23 | −33.222 | 1 | | |
| | 24 | 41.268 | 2.02 | 1.61800 | 63.40 |
| | 25 | −750.000 | (D25) | | |
| GR5 | 26(ASP) | −242.500 | 0.9 | 1.69350 | 53.20 |
| | 27(ASP) | 15.504 | (D27) | | |
| GR6 | 28 | 34.502 | 3.16 | 1.51742 | 52.15 |
| | 29 | −150.000 | (D29) | | |

TABLE 2

Example 1

| Surface No | K | A4 | A6 | A8 | A10 |
|---|---|---|---|---|---|
| 6 | 0 | −1.7003E−05 | 2.9207E−07 | −1.4891E−09 | 2.4818E−12 |
| 7 | 0 | −2.2803E−05 | 9.2713E−08 | 3.8834E−09 | 0.0000E+00 |
| 12 | 0 | −3.3902E−05 | 1.4348E−07 | −6.1643E−09 | 4.7703E−11 |
| 19 | −7.4971 | −5.5873E−05 | 2.2331E−07 | −1.6262E−09 | 9.6401E−12 |
| 26 | 0 | −2.8193E−05 | 2.6882E−07 | −2.6307E−09 | 0.0000E+00 |
| 27 | −0.22886 | −4.4572E−05 | 8.5447E−08 | −5.6155E−10 | −1.2462E−11 |

TABLE 3

Example 1

| Fno | 4.12 | 4.12 | 4.12 |
|---|---|---|---|
| f | 16.48 | 35.00 | 67.90 |
| ω | 40.75 | 22.08 | 11.81 |
| D5 | 1.000 | 13.861 | 28.117 |
| D12 | 12.717 | 5.608 | 1.600 |
| D18 | 5.025 | 2.073 | 1.001 |
| D25 | 5.437 | 3.829 | 2.502 |
| D27 | 4.563 | 6.171 | 7.498 |
| D29 | 14.754 | 28.957 | 41.773 |

Figure 3:
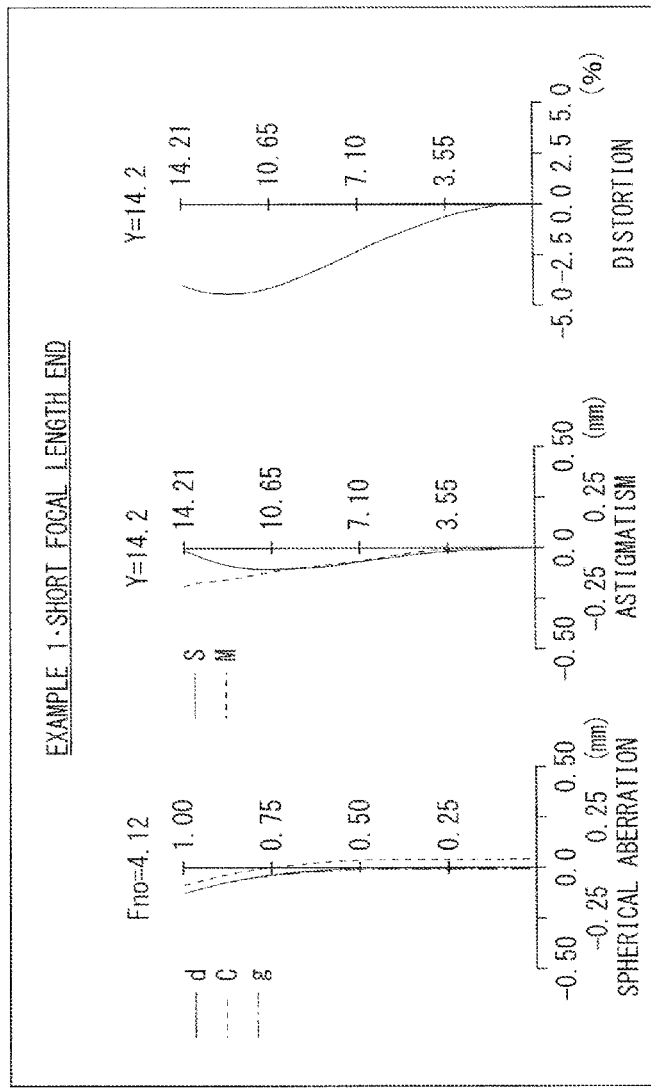
FIG. 3 is an aberration diagram that illustrates various aberrations in a short focal length end state, of a zoom lens corresponding to Numerical example 1.
Figure 4:
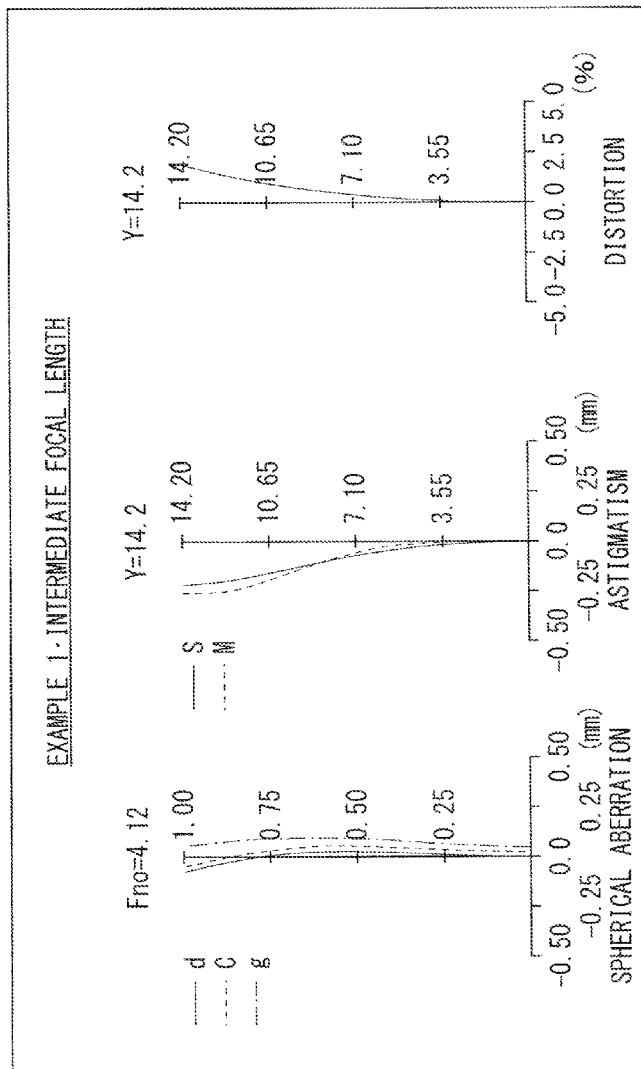
FIG. 4 is an aberration diagram that illustrates various aberrations in an intermediate focal length state, of the zoom lens corresponding to Numerical example 1.
Figure 5:
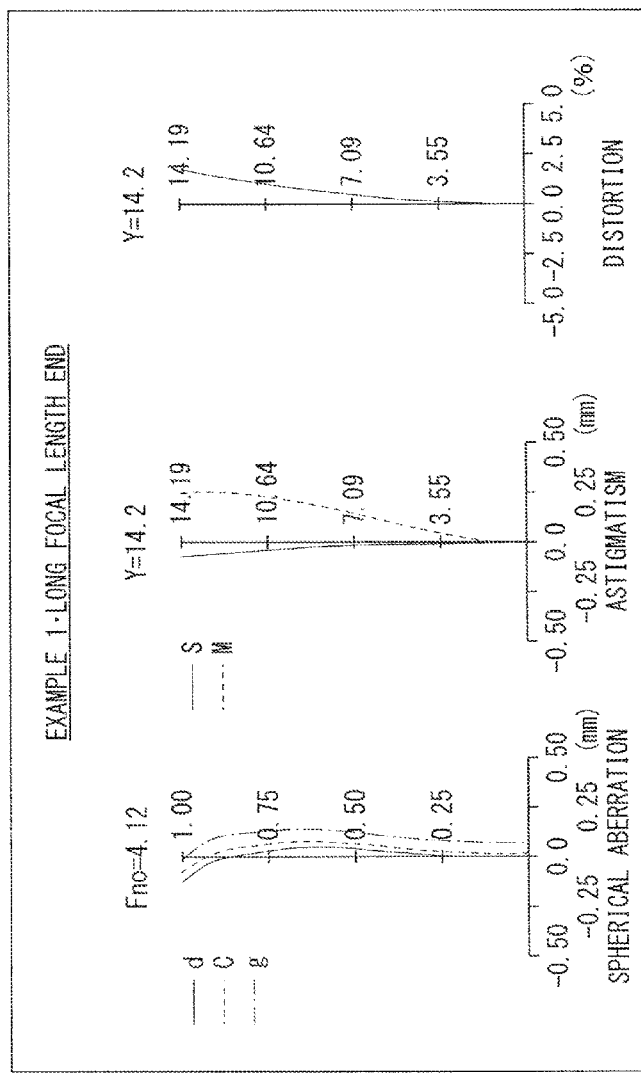
FIG. 5 is an aberration diagram that illustrates various aberrations in a long focal length end state, of the zoom lens corresponding to Numerical example 1.

FIGS. 3 to 11 illustrates aberration performance of the zoom lens 1 corresponding to the above-described Numerical example 1. FIG. 3 illustrates various aberrations in the short focal length end state. FIG. 4 illustrates various aberrations in the intermediate focal length state. FIG. 5 illustrates various aberrations in the long focal length end state.

FIGS. 3 to 5 each illustrate spherical aberration, astigmatism (field curvature), and distortion, as the various aberrations. Each of the aberration diagrams, aberration is shown with a d-line (587.6 nm) as a reference wavelength. The spherical aberration diagram also shows aberrations of C-line (656.27 nm) and of g-line (435.83 nm). In the astigmatism diagram, a solid line (S) shows aberration at a sagittal image plane, and a dashed line (M) shows aberration at a meridional image plane. "Y" indicates an image height.

Figure 6:
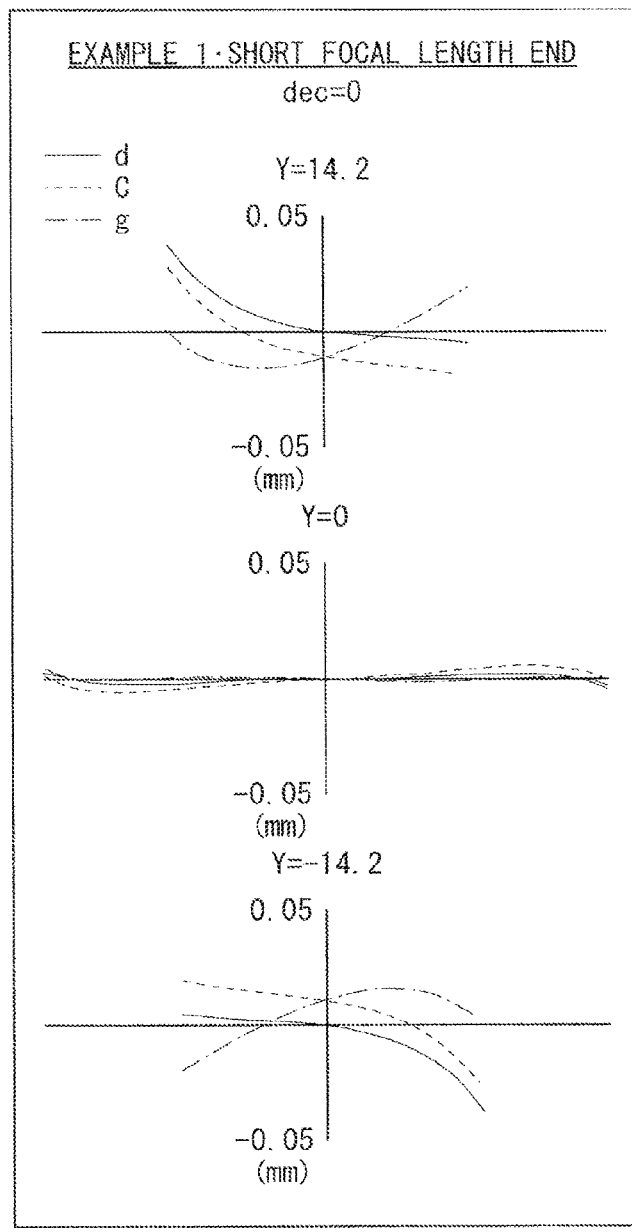
FIG. 6 is an aberration diagram that illustrates a lateral aberration in a case where no image blur compensation is performed in the short focal length end state, of the zoom lens corresponding to Numerical example 1.
Figure 7:
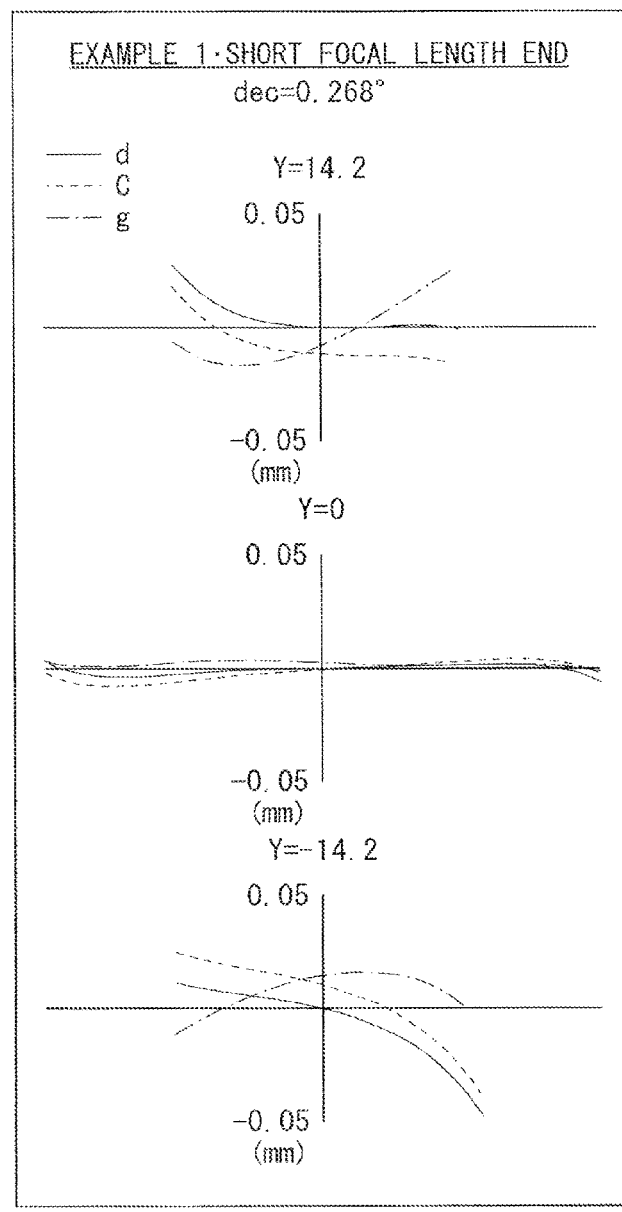
FIG. 7 is an aberration diagram that illustrates a lateral aberration in a case where the image blur compensation is performed in the short focal length end state, of the zoom lens corresponding to Numerical example 1.
Figure 8:
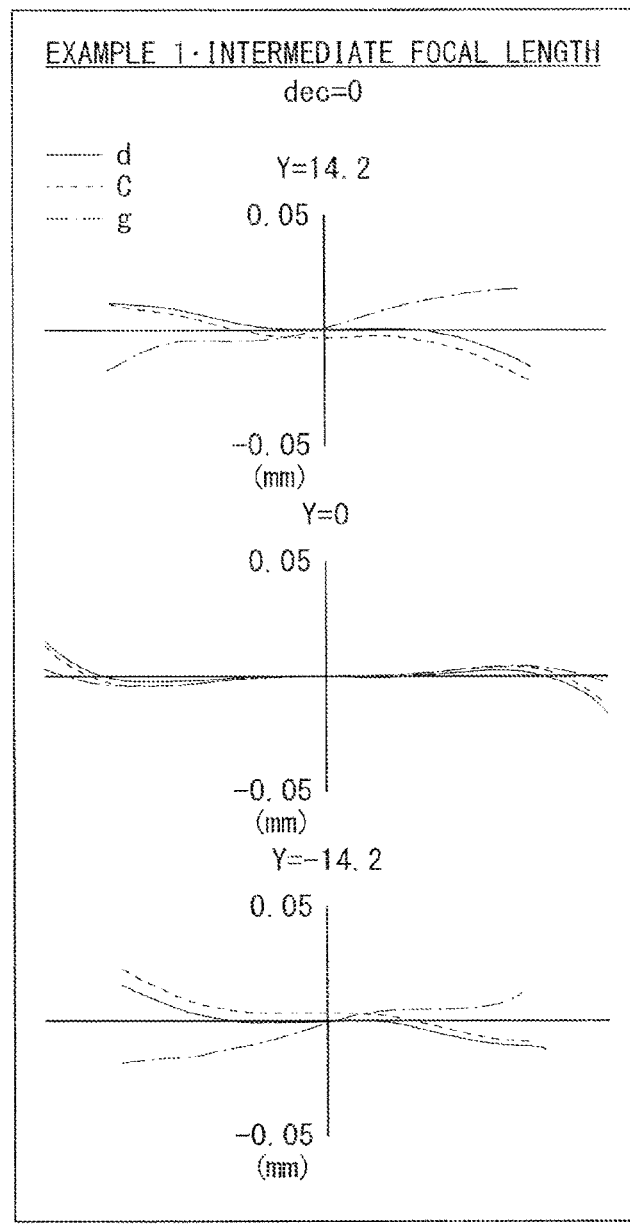
FIG. 8 is an aberration diagram that illustrates a lateral aberration in a case where no image blur compensation is performed in the intermediate focal length state, of the zoom lens corresponding to Numerical example 1.
Figure 9:
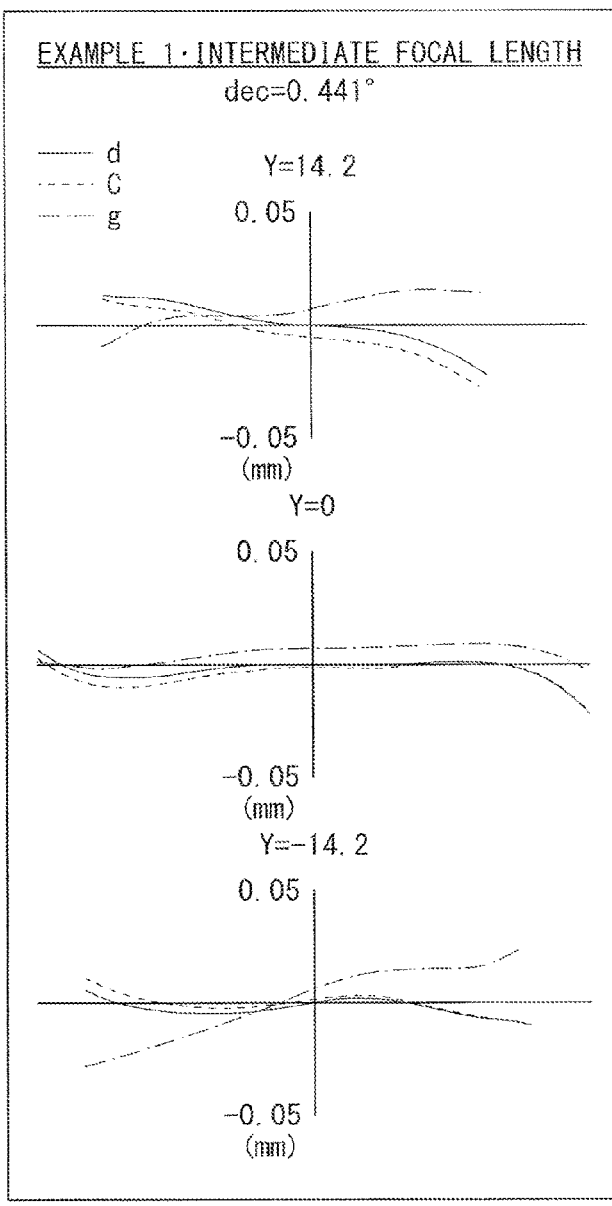
FIG. 9 is an aberration diagram that illustrates a lateral aberration in a case where the image blur compensation is performed in the intermediate focal length state, of the zoom lens corresponding to Numerical example 1.
Figure 10:
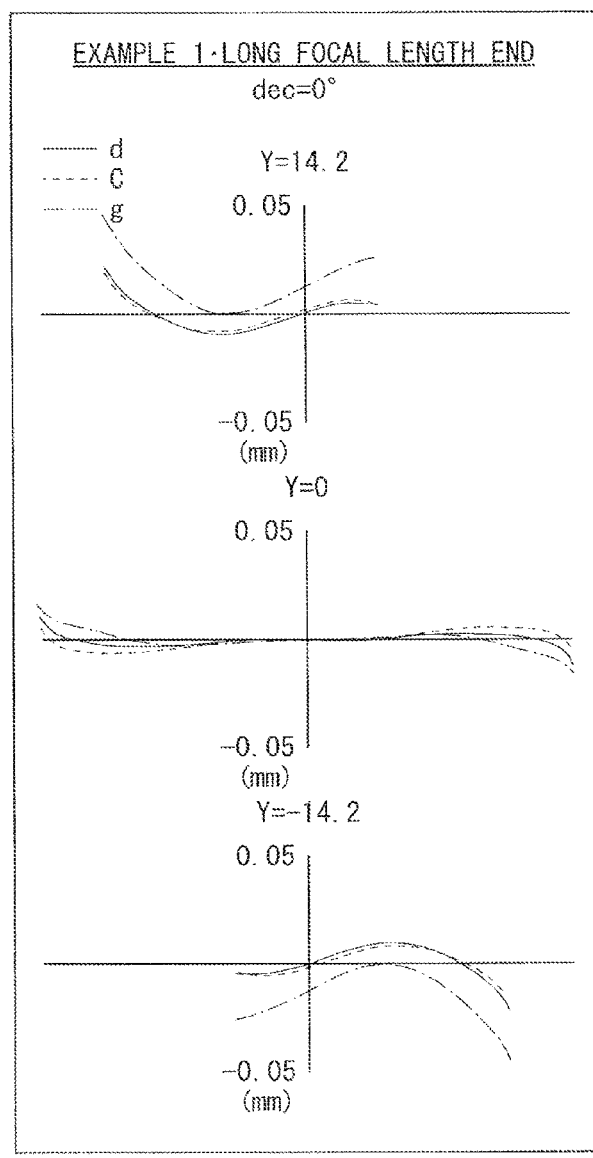
FIG. 10 is an aberration diagram that illustrates a lateral aberration in a case where no image blur compensation is performed in the long focal length end state, of the zoom lens corresponding to Numerical example 1.
Figure 11:
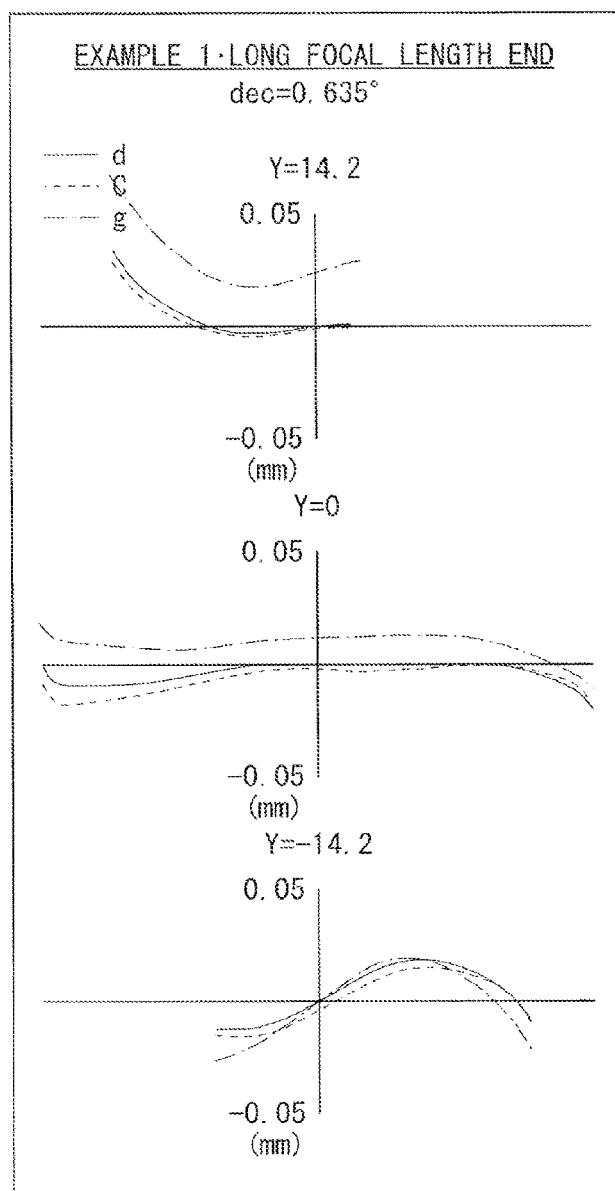
FIG. 11 is an aberration diagram that illustrates a lateral aberration in a case where the image blur compensation is performed in the long focal length end state, of the zoom lens corresponding to Numerical example 1.

FIGS. 6 to 11 each illustrate lateral aberration. In FIGS. 6 to 11, "d" shows an angle of shake of the optical system resulting from shake of a hand, etc. FIG. 6 shows lateral aberration in a case where no image blur compensation is performed in the short focal length end state. FIG. 7 shows lateral aberration in a case where image blur compensation is performed in the short focal length end state. FIG. 8 shows lateral aberration in a case where no image blur compensation is performed in the intermediate focal length state. FIG. 9 shows lateral aberration in a case where image blur compensation is performed in the intermediate focal length state. FIG. 10 shows lateral aberration in a case where no image blur compensation is performed in the long focal length end state. FIG. 11 shows lateral aberration in a case where image blur compensation is performed in the long focal length end state. The image blur compensation is performed through allowing the second sub-lens group GR4r in the fourth lens group GR4 to move in the direction perpendicular to the optical axis Z1.

As can be clearly seen from the respective aberration diagrams described above, the various aberrations are favorably corrected, and superior optical performance is achieved.

Numerical Example 2

Tables 4 to 6 show specific numerical examples that correspond to the zoom lens 2 according to the second configuration example shown in FIG. 2. In particular, Table 4 shows basic lens data thereof, Table 5 shows data related to aspherical surfaces, and Table 6 shows other data.

In this Numerical example 2, the first lens group GR1 is configured of a cemented lens in which a negative meniscus lens L11 is attached to a positive meniscus lens L12, and a positive meniscus lens L13, that are arranged in order from the object side. The negative meniscus lens L11 has a convex surface facing toward the object side. The positive meniscus lens L12 has a convex surface facing toward the object side. The positive meniscus lens L13 has a convex surface facing toward the object side. The second lens group GR2 is configured of a negative meniscus lens L21, a cemented lens in which a biconcave lens L22 is attached to a biconvex lens L23, and a negative meniscus lens L24, that are arranged in order from the object side. The negative meniscus lens L21 has a convex surface facing toward the object side. The negative meniscus lens L24 has a concave surface facing toward the object side. The third lens group GR3 is configured of a positive meniscus lens L31A, and a cemented lens in which a biconvex lens L32A is attached to a negative meniscus lens L33A, that are arranged in order from the object side. The positive meniscus lens L31A has a convex surface facing toward the object side. The negative meniscus lens L33A has a concave surface facing toward the object side. The fourth lens group GR4 is configured of a biconvex lens L41, the first sub-lens group GR4f, and the second sub-lens group GR4r, that are arranged in order from the object side. The first sub-lens group GR4f is configured of a cemented lens in which a biconcave lens L42 is attached to a biconvex lens L43. The second sub-lens group GR4r is configured of a positive meniscus lens L44 that has a convex surface facing toward the object side. By allowing the second sub-lens group GR4r to move, as the lens group for image blur compensation, in the direction perpendicular to the optical axis Z1, an image is allowed to be shifted. The fifth lens group GR5 is configured of a biconcave lens L51. The focusing operation is allowed to be performed when the subject distance varies from the infinite to a closer distance through allowing the fifth lens group GR5 to travel along the optical axis. The sixth lens group GR6 is configured of a positive meniscus lens L61 that has a convex surface facing toward the object side.

In this Numerical example 2, both surfaces of the negative meniscus lens L21 in the second lens group GR2 and an object-sided surface of the positive meniscus lens L31A in the third lens group GR3 are aspherical. Also, both surfaces of the biconvex lens L41 in the fourth lens group GR4 and an image-sided surface of the biconcave lens L51 in the fifth lens group GR5 are aspherical. Table 5 shows values of aspherical surface coefficients A4, A6, A8, and A10 of 4th-order, 6th-order, 8th-order, and 10th-order of the above-mentioned aspherical surfaces together with values of conic constant K.

Table 6 shows values of a total focal length f, a F number Fno, and a half angle of view ω of the zoom lens in a short focal length end state, in an intermediate focal length state that is between the short focal length end state and a long focal length end state, and in the long focal length end state. In this Numerical example 2, when the lens position state varies from the wide end state to the telephoto end state, all of the first to sixth lens groups GR1 to GR6 travel along the optical axis. At that time, surface spacings D5, D12, D18, D25, D27, and D29 on both sides of each of the first to sixth lens groups GR1 to GR6 vary. Table 6 also shows values of the surface spacings D5, D12, D18, D25, D27, and D29 in the short focal length end state, in the intermediate focal length state, and in the long focal length end state.

TABLE 4

Example 2

| Lens group | Surface No | Ri | Di | Ni | vdi |
|---|---|---|---|---|---|
| GR1 | 1 | 65.265 | 1.5 | 1.84666 | 23.78 |
|  | 2 | 47.862 | 4.9 | 1.49700 | 81.61 |
|  | 3 | 265.054 | 0.1 |  |  |
|  | 4 | 44.700 | 4.54 | 1.48749 | 70.44 |
|  | 5 | 195.729 | (D5) |  |  |
| GR2 | 6(ASP) | 106.230 | 1.4 | 1.88202 | 37.22 |
|  | 7(ASP) | 11.948 | 5.45 |  |  |
|  | 8 | −29.099 | 0.8 | 1.59349 | 67.00 |
|  | 9 | 16.079 | 3.37 | 1.84666 | 23.78 |
|  | 10 | −86.499 | 1.59 |  |  |
|  | 11 | −16.604 | 0.85 | 1.91082 | 35.25 |
|  | 12 | −25.767 | (D12) |  |  |
|  | 13(STO) | Infinity | 0.5 |  |  |
| GR3 | 14(ASP) | 28.394 | 2.18 | 1.83441 | 37.29 |
|  | 15 | 206.156 | 0.25 |  |  |
|  | 16 | 25.044 | 4.87 | 1.49700 | 81.61 |
|  | 17 | −14.559 | 0.8 | 1.91082 | 35.25 |
|  | 18 | −172.078 | (D18) |  |  |
| GR4 | 19(ASP) | 42.645 | 3.32 | 1.80610 | 40.73 |
|  | 20(ASP) | −23.173 | 0.25 |  |  |
|  | 21 | −750.000 | 0.85 | 1.91082 | 35.25 |
|  | 22 | 13.694 | 4.4 | 1.48749 | 70.44 |
|  | 23 | −35.630 | 1 |  |  |
|  | 24 | 27.571 | 2.02 | 1.59349 | 67.00 |
|  | 25 | 135.889 | (D25) |  |  |
| GR5 | 26 | −788.952 | 1 | 1.59201 | 67.02 |
|  | 27(ASP) | 15.161 | (D27) |  |  |
| GR6 | 28 | 30.313 | 2.49 | 1.56732 | 42.84 |
|  | 29 | 100.000 | (D29) |  |  |

TABLE 5

Example 2

| Surface No | K | A4 | A6 | A8 | A10 |
|---|---|---|---|---|---|
| 6 | 0 | 2.2782E−05 | 8.3224E−09 | −4.5531E−10 | 1.7153E−12 |
| 7 | 0 | 6.0932E−06 | 1.5780E−07 | −1.5242E−10 | 0.0000E+00 |
| 14 | 0 | −6.2287E−07 | 1.0187E−08 | 1.1810E−11 | 4.7617E−13 |
| 19 | 0 | −4.9922E−05 | −4.6357E−08 | 3.0773E−10 | 4.1301E−12 |
| 20 | 0 | −2.3256E−06 | −1.4588E−07 | 8.7115E−10 | 0.0000E+00 |
| 27 | 0 | −1.4279E−05 | −2.2288E−07 | 5.9550E−10 | −1.1196E−11 |

TABLE 6

Example 2

| Fno | 3.60 | 4.40 | 4.63 |
|---|---|---|---|
| f | 16.48 | 46.73 | 77.60 |
| ω | 40.75 | 16.90 | 10.37 |
| D5 | 0.8 | 18.588 | 31.094 |
| D12 | 12.291 | 3.816 | 1.500 |

TABLE 6-continued

| | Example 2 | | |
|---|---|---|---|
| D18 | 4.659 | 1.233 | 0.800 |
| D25 | 4.879 | 3.081 | 2.400 |
| D27 | 4.942 | 6.740 | 7.421 |
| D29 | 14.319 | 36.946 | 46.074 |

Figure 12:
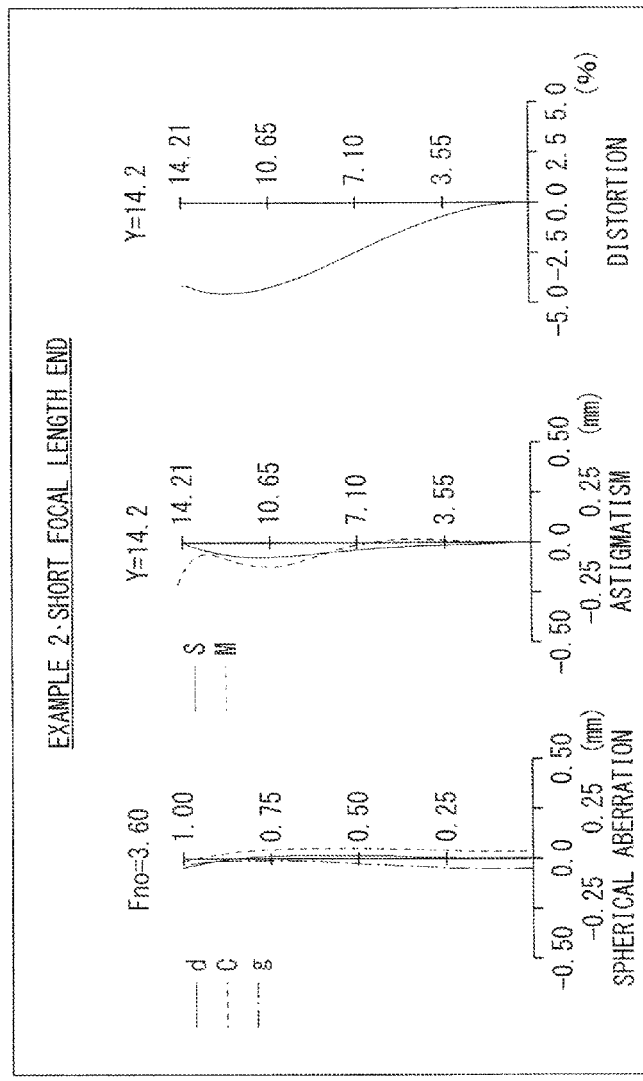
FIG. 12 is an aberration diagram that illustrates various aberrations in a short focal length end state, of a zoom lens corresponding to Numerical example 2.
Figure 13:
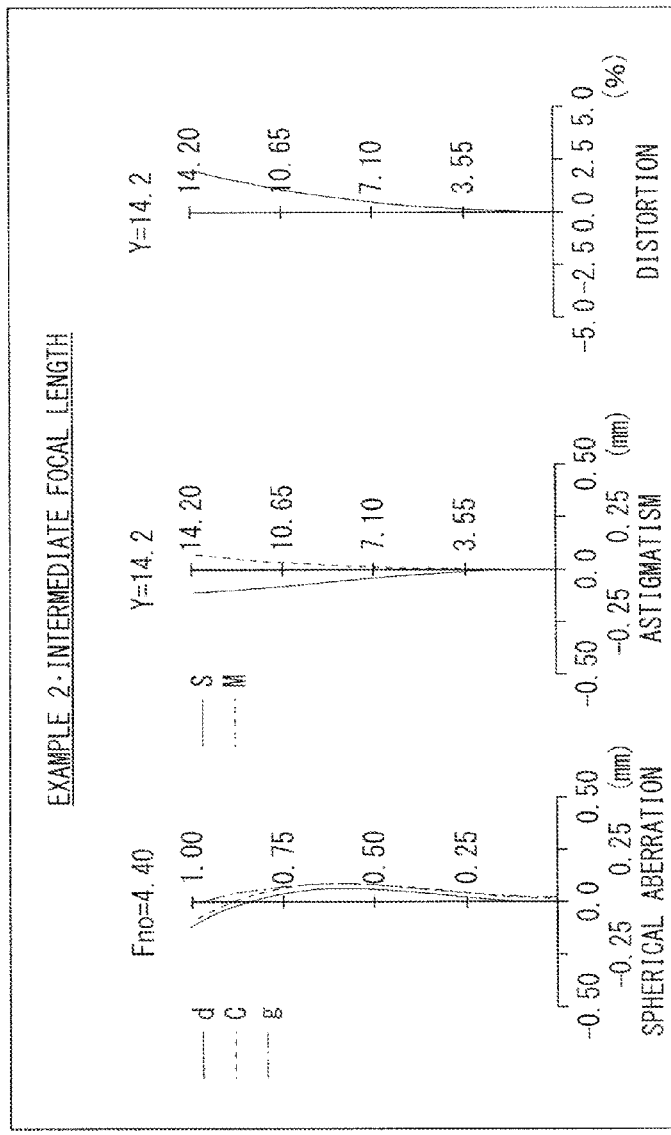
FIG. 13 is an aberration diagram that illustrates various aberrations in an intermediate focal length state, of the zoom lens corresponding to Numerical example 2.
Figure 14:
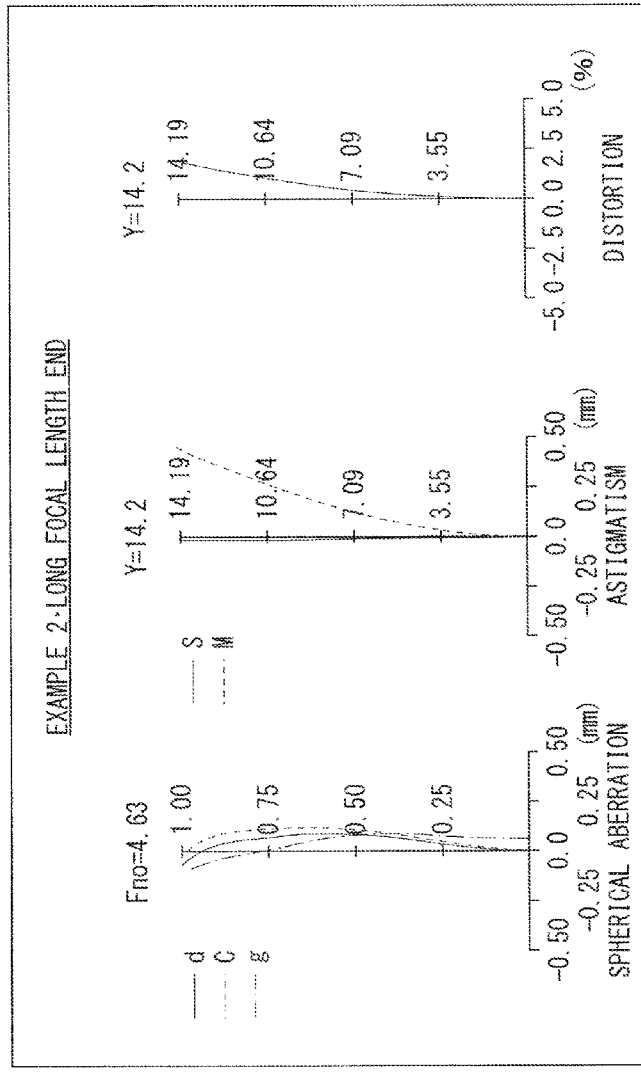
FIG. 14 is an aberration diagram that illustrates various aberrations in a long focal length end state, of the zoom lens corresponding to Numerical example 2.

FIGS. 12 to 20 illustrate aberration performance of the zoom lens 2 corresponding to the above-described Numerical example 2. FIG. 12 illustrates various aberrations in the short focal length end state. FIG. 13 illustrates various aberrations in the intermediate focal length state. FIG. 14 illustrates various aberrations in the long focal length end state.

FIGS. 12 to 14 each illustrate spherical aberration, astigmatism (field curvature), and distortion, as the various aberrations. Each of the aberration diagrams, aberration is shown with a d-line (587.6 nm) as a reference wavelength. The spherical aberration diagram also shows aberrations of a C-line (656.27 nm) and of a g-line (435.83 nm). In the astigmatism diagram, a solid line (S) shows aberration at a sagittal image plane, and a dashed line (M) shows aberration at a meridional image plane. "Y" indicates an image height.

Figure 15:
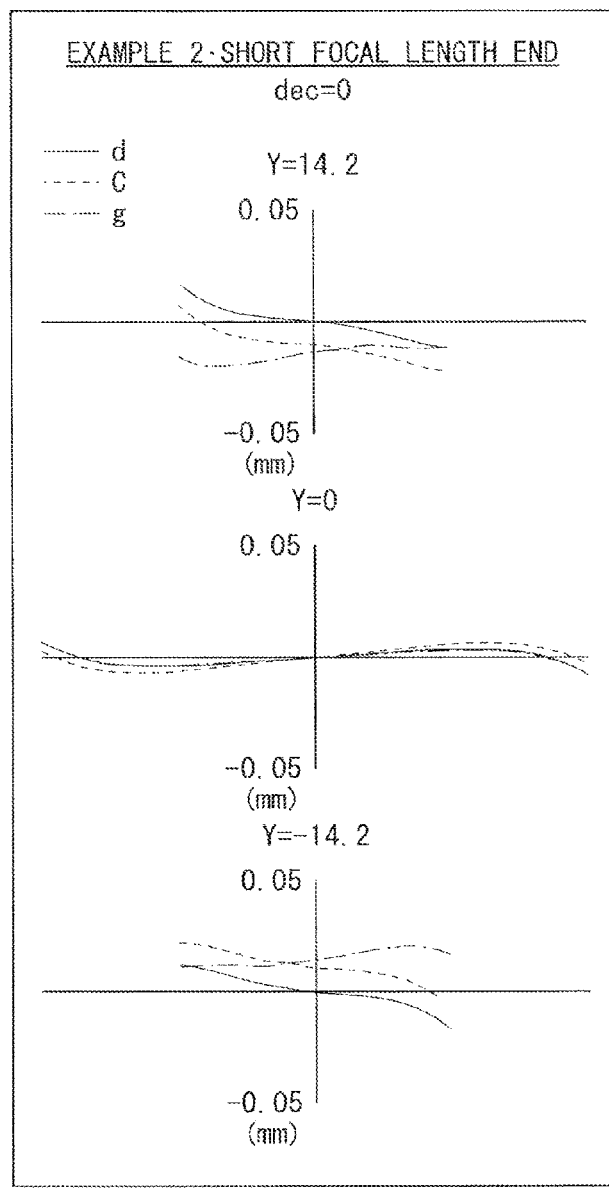
FIG. 15 is an aberration diagram that illustrates a lateral aberration in a case where no image blur compensation is performed in the short focal length end state, of the zoom lens corresponding to Numerical example 2.
Figure 16:
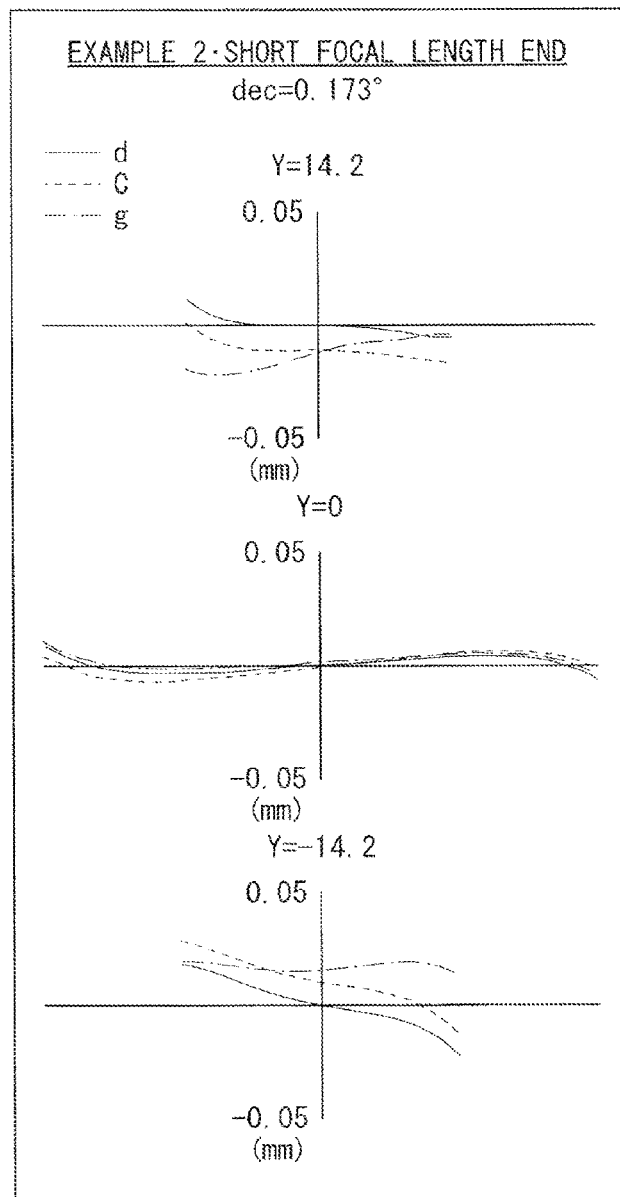
FIG. 16 is an aberration diagram that illustrates a lateral aberration in a case where the image blur compensation is performed in the short focal length end state, of the zoom lens corresponding to Numerical example 2.
Figure 17:
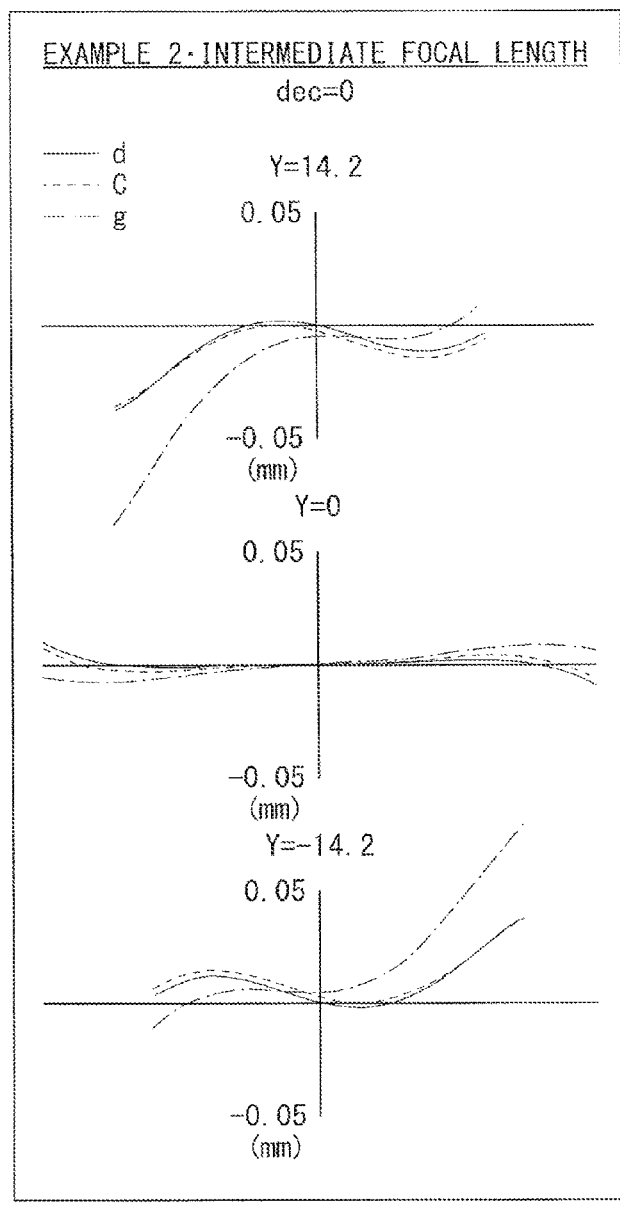
FIG. 17 is an aberration diagram that illustrates a lateral aberration in a case where no image blur compensation is performed in the intermediate focal length state, of the zoom lens corresponding to Numerical example 2.
Figure 18:
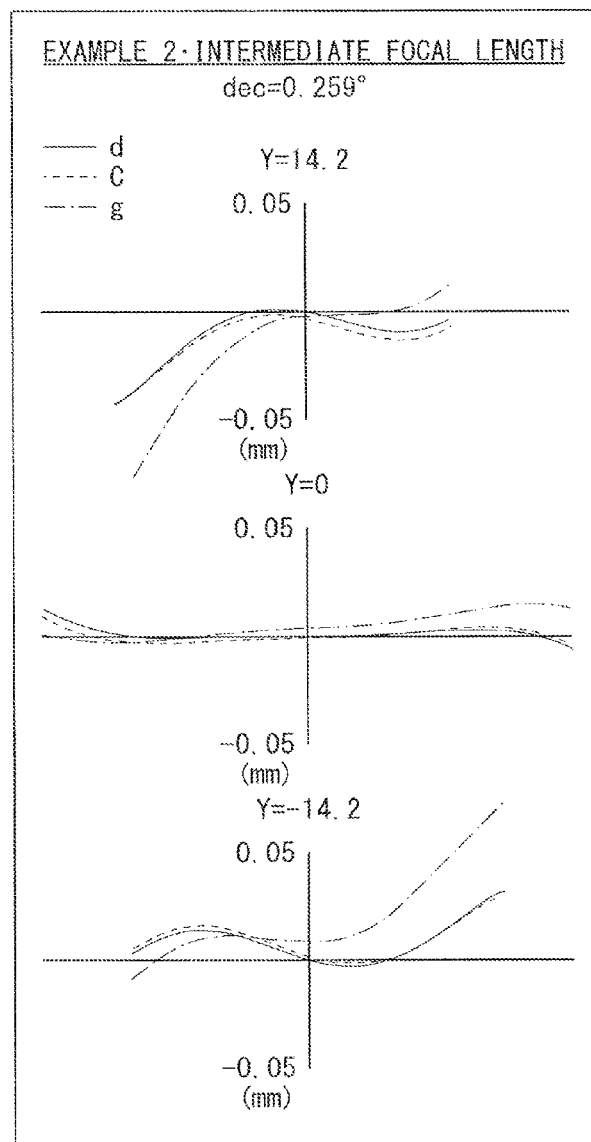
FIG. 18 is an aberration diagram that illustrates a lateral aberration in a case where the image blur compensation is performed in the intermediate focal length state, of the zoom lens corresponding to Numerical example 2.
Figure 19:
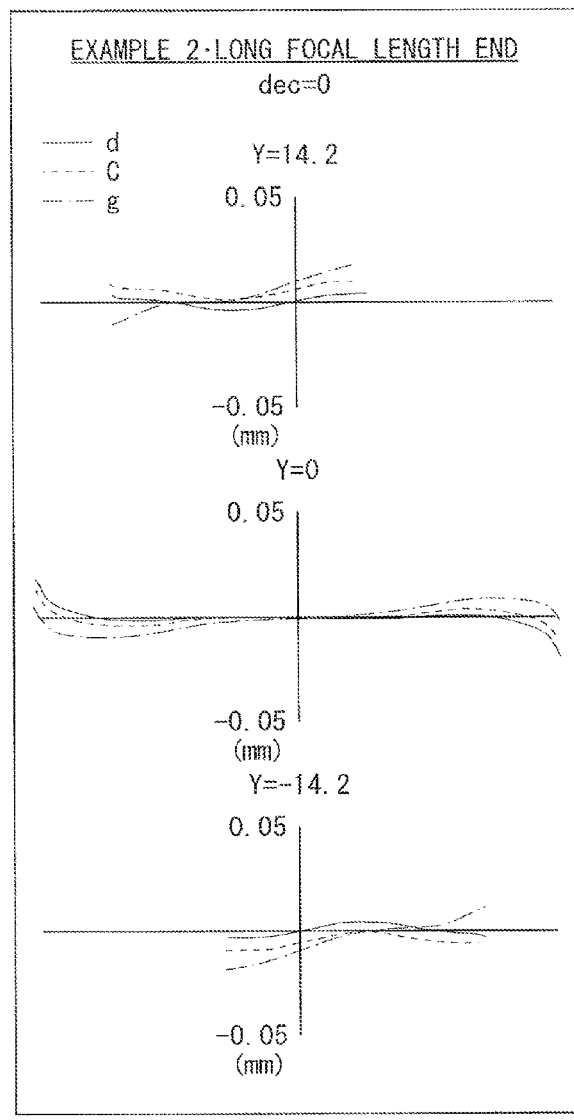
FIG. 19 is an aberration diagram that illustrates a lateral aberration in a case where no image blur compensation is performed in the long focal length end state, of the zoom lens corresponding to Numerical example 2.
Figure 20:
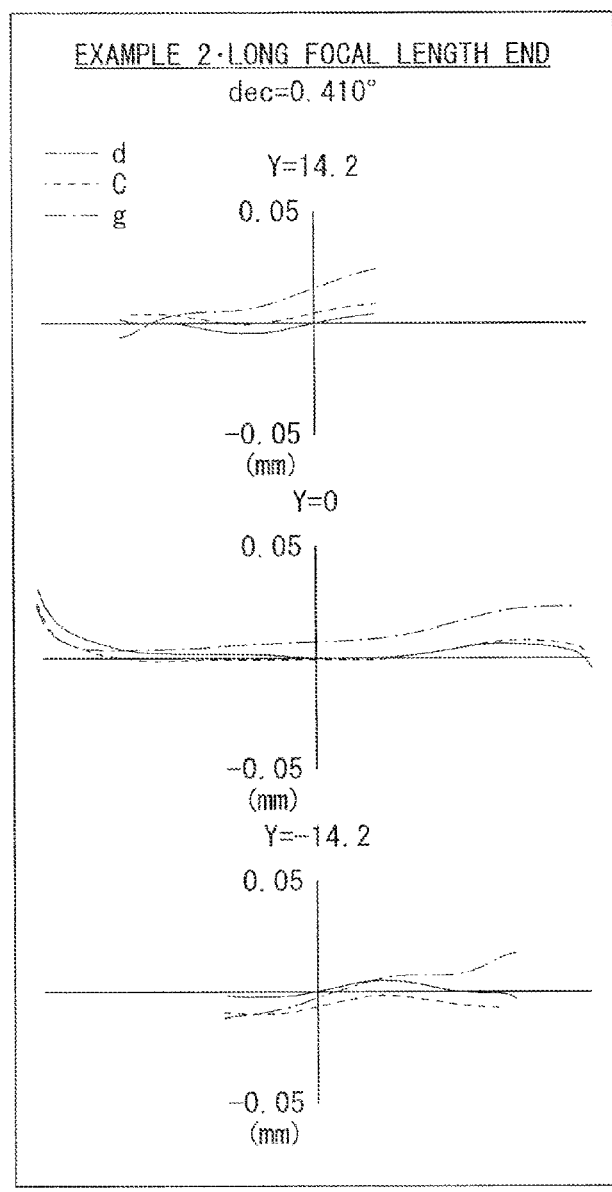
FIG. 20 is an aberration diagram that illustrates a lateral aberration in a case where the image blur compensation is performed in the long focal length end state, of the zoom lens corresponding to Numerical example 2.

FIGS. 15 to 20 each illustrate lateral aberration. In FIGS. 15 to 20, "d" shows an angle of shake of the optical system resulting from shake of a hand, etc. FIG. 15 shows lateral aberration in a case where no image blur compensation is performed in the short focal length end state. FIG. 16 shows lateral aberration in a case where image blur compensation is performed in the short focal length end state. FIG. 17 shows lateral aberration in a case where no image blur compensation is performed in the intermediate focal length state. FIG. 18 shows lateral aberration in a case where image blur compensation is performed in the intermediate focal length state. FIG. 19 shows lateral aberration in a case where no image blur compensation is performed in the long focal length end state. FIG. 20 shows lateral aberration in a case where image blur compensation is performed in the long focal length end state. The image blur compensation is performed through allowing the second sub-lens group GR4r in the fourth lens group GR4 to move in the direction perpendicular to the optical axis Z1.

As can be clearly seen from the respective aberration diagrams described above, the various aberrations are favorably corrected, and superior optical performance is achieved.

[Other Numerical Value Data of Respective Examples]

Table 7 shows values related to the above-described respective conditional expressions that are summarized for the respective numerical examples. As can be seen from Table 7, the value in each of the numerical examples falls within a range of that numerical value for each conditional expression.

TABLE 7

| Conditional expression | Example 1 | Example 2 |
|---|---|---|
| f4/f6 | 0.32 | 0.27 |
| f6/fT | 0.80 | 0.98 |
| f1/fT | 1.14 | 1.06 |
| (R4bf − R4br)/(R4bf + R4br) | −1.11 | −0.66 |
| (R6f − R6r)/(R6f + R6r) | −1.60 | −0.53 |

[5. Other Embodiments]

The technology of the present disclosure is not limited to the description above of some embodiments and Examples, and various modifications may be made.

For example, the shapes and the numerical values of the respective sections shown in the above-described respective numerical examples are mere examples to specifically embody the present technology, and the technical range of the present technology should not be limitedly understood based on those examples.

Further, the above embodiment and Examples have been described with a configuration substantially configured of six lens groups. However, a lens that has substantially no refractive power may be further provided.

It is possible to achieve at least the following configurations from the above-described example embodiments and the modifications of the disclosure.

[1] A zoom lens including:
a first lens group having positive refractive power;
a second lens group having negative refractive power;
a third lens group having positive refractive power;
a fourth lens group having positive refractive power;
a fifth lens group having negative refractive power; and
a sixth lens group having positive refractive power,
the first to sixth lens groups being arranged in order from an object side, wherein
a total length of the zoom lens varies when a lens position state varies from a wide end state to a telephoto end state, and
a focusing operation is performed through allowing the fifth lens group to travel along an optical axis in accordance with variation in a subject distance from infinite to a closer distance.

[2] The zoom lens according to [1], wherein a following conditional expression is satisfied, $$0<f4/f6<0.8 \quad (1)$$

where f4 is a focal length of the fourth lens group, and f6 is a focal length of the sixth lens group.

[3] The zoom lens according to [1] or [2], wherein a following conditional expression is satisfied, $$0.6<f6/fT<1.0 \quad (2)$$

where fT is a total focal length of the zoom lens in the telephoto end state.

[4] The zoom lens according to any one of [1] to [3], wherein a following conditional expression is satisfied, $$1.0<f1/fT<2.0 \quad (3)$$

where f1 is a focal length of the first lens group.

[5] The zoom lens according to any one of [1] to [4], wherein the fourth lens group includes a plurality of lenses, and an image is shifted through allowing one or more lenses out of the plurality of lenses in the fourth lens group to move in a direction perpendicular to the optical axis.

[6] The zoom lens according to any one of [1] to [5], wherein the fourth lens group is configured of a first sub-lens group and a second sub-lens group that are arranged in order from the object side, and an image is shifted through allowing the second sub-lens group to move in a direction perpendicular to the optical axis.

[7] The zoom lens according to [6], wherein a following conditional expression is satisfied, $$-2.0<(R4bf-R4br)/(R4bf+R4br)<-0.5 \quad (4)$$

where R4*bf* is a curvature radius of a most-object-sided lens surface in the second sub-lens group, and
R4*br* is a curvature radius of a most-image-sided lens surface in the second sub-lens group.

[8] The zoom lens according to any one of [1] to [7], wherein a following conditional expression is satisfied, $$-2.5<(R6f-R6r)/(R6f+R6r)<0 \qquad (5)$$

where R6*f* is a curvature radius of a most-object-sided lens surface in the sixth lens group, and
R6*r* is a curvature radius of a most-image-sided lens surface in the sixth lens group.

[9] The zoom lens according to any one of [1] to [8], wherein the fifth lens group is configured of a single lens.

[10] The zoom lens according to any one of [1] to [9], wherein all of the first to sixth lens groups travel along the optical axis when the lens position state varies from the wide end state to the telephoto end state.

[11] The zoom lens according to any one of [1] to [10], wherein the fourth lens group and the six lens group travel along the optical axis together when the lens position state varies from the wide end state to the telephoto end state.

[12] The zoom lens according to any one of [1] to [11], further including a lens that substantially has no refractive power.

[13] An imaging apparatus with a zoom lens and an imaging device outputting an imaging signal based on an optical image formed by the zoom lens, the zoom lens including:
a first lens group having positive refractive power;
a second lens group having negative refractive power;
a third lens group having positive refractive power;
a fourth lens group having positive refractive power;
a fifth lens group having negative refractive power; and
a sixth lens group having positive refractive power,
the first to sixth lens groups being arranged in order from an object side, wherein
a total length of the zoom lens varies when a lens position state varies from a wide end state to a telephoto end state, and
a focusing operation is performed through allowing the fifth lens group to travel along an optical axis in accordance with variation in a subject distance from infinite to a closer distance.

[14] The imaging apparatus according to [13], further including a lens that substantially has no refractive power.

It should be understood by those skilled in the art that various modifications, combinations, sub-combinations, and alterations may occur depending on design requirements and other factors insofar as they are within the scope of the appended claims or the equivalents thereof.

What is claimed is:

1. A zoom lens comprising:
a first lens group having positive refractive power;
a second lens group having negative refractive power;
a third lens group having positive refractive power;
a fourth lens group having positive refractive power;
a fifth lens group having negative refractive power; and
a sixth lens group having positive refractive power,
the first to sixth lens groups being arranged in order from an object side, wherein
a first total length of the zoom lens at a wide end state is different from a second total length of the zoom lens at a telephoto end state,
a focusing operation is performed through allowing the fifth lens group to travel along an optical axis in accordance with variation in a subject distance from infinite to a closer distance, and a following conditional expression is satisfied, $$1.0<f1//fT<2.0 \qquad (3)$$

where f1 is a focal length of the first lens group and where fT is a total focal length of the zoom lens in the telephoto end state.

2. The zoom lens according to claim 1, wherein a following conditional expression is satisfied, $$0<f4/f6<0.8 \qquad (1)$$

where f4 is a focal length of the fourth lens group, and f6 is a focal length of the sixth lens group.

3. The zoom lens according to claim 1, wherein
the fourth lens group includes a plurality of lenses, and
an image is shifted through allowing one or more lenses out of the plurality of lenses in the fourth lens group to move in a direction perpendicular to the optical axis.

4. The zoom lens according to claim 1, wherein
the fourth lens group is configured of a first sub-lens group and a second sub-lens group that are arranged in order from the object side, and
an image is shifted through allowing the second sub-lens group to move in a direction perpendicular to the optical axis.

5. The zoom lens according to claim 4, wherein a following conditional expression is satisfied, $$-2.0<(R4bf-R4br)/(R4bf+R4br)<-0.5 \qquad (4)$$

where R4*bf* is a curvature radius of a most-object-sided lens surface in the second sub-lens group, and
R4*br* is a curvature radius of a most-image-sided lens surface in the second sub-lens group.

6. The zoom lens according to claim 1, wherein a following conditional expression is satisfied, $$-2.5<(R6f-R6r)/(R6f+R6r)<0 \qquad (5)$$

where R6*f* is a curvature radius of a most-object-sided lens surface in the sixth lens group, and
R6*r* is a curvature radius of a most-image-sided lens surface in the sixth lens group.

7. The zoom lens according to claim 1, wherein a lens position state of the zoom lens is configured to vary from the wide end state to the telephoto end state, and wherein all of the first to sixth lens groups are configured to travel along the optical axis when the lens position state of the zoom lens varies from the wide end state to the telephoto end state.

8. The zoom lens according to claim 1, wherein a lens position state of the zoom lens is configured to vary from the wide end state to the telephoto end state, and wherein the fourth lens group and the sixth lens group are configured to travel along the optical axis together when the lens position state of the zoom lens varies from the wide end state to the telephoto end state.

9. The zoom lens according to claim 1, wherein the fifth lens group is configured of a single lens.

10. The zoom lens according to claim 1, wherein a following conditional expression is satisfied, $$0.2<f4/f6<0.4 \qquad (1)'$$

where f4 is a focal length of the fourth lens group, and f6 is a focal length of the sixth lens group.

11. An imaging apparatus comprising:
a zoom lens having
a first lens group having positive refractive power,
a second lens group having negative refractive power,
a third lens group having positive refractive power,
a fourth lens group having positive refractive power,
a fifth lens group having negative refractive power, and a sixth lens group having positive refractive power,
the first to sixth lens groups being arranged in order from an object side, wherein a first total length of the zoom lens at a wide end state is different from a second total length of the zoom lens at a telephoto end state,
a focusing operation is performed through allowing the fifth lens group to travel along an optical axis in accordance with variation in a subject distance from infinite to a closer distance, and
a following conditional expression is satisfied, $$1.0 < f1/fT < 2.0 \quad (3)$$

where f1 is a focal length of the first lens group and where fT is a total focal length of the zoom lens in the telephoto end state; and
an imaging device configured to output an imaging signal based on an optical image formed by the zoom lens.

12. The zoom lens according to claim 1, wherein a following conditional expression is satisfied, $$0.6 < f6/fT < 1.0 \quad (2)$$

where f6 is a focal length of the sixth lens group.

13. The imaging apparatus according to claim 11, wherein a following conditional expression is satisfied, $$0.6 < f6/fT < 1.0 \quad (2)$$

where f6 is a focal length of the sixth lens group.

14. The imaging apparatus according to claim 11, wherein the fifth lens group is configured of a single lens.

15. The imaging apparatus according to claim 11, wherein a lens position state of the zoom lens is configured to vary from the wide end state to the telephoto end state, and wherein all of the first to sixth lens groups are configured to travel along the optical axis when the lens position state of the zoom lens varies from the wide end state to the telephoto end state.

16. The imaging apparatus according to claim 11, wherein a lens position state of the zoom lens is configured to vary from the wide end state to the telephoto end state, and wherein the fourth lens group and the sixth lens group are configured to travel along the optical axis together when the lens position state of the zoom lens varies from the wide end state to the telephoto end state.

17. The imaging apparatus according to claim 11, wherein a following conditional expression is satisfied, $$0 < f4/f6 < 0.8 \quad (1)$$

where f4 is a focal length of the fourth lens group, and f6 is a focal length of the sixth lens group.

18. The imaging apparatus according to claim 11, wherein a following conditional expression is satisfied, $$0.2 < f4/f6 < 0.4 \quad (1)'$$

where f4 is a focal length of the fourth lens group, and f6 is a focal length of the sixth lens group.

* * * * *